US012484099B2

United States Patent
Ito et al.

(10) Patent No.: US 12,484,099 B2
(45) Date of Patent: Nov. 25, 2025

(54) COMMUNICATION SYSTEM

(71) Applicant: HONDA MOTOR CO., LTD., Tokyo (JP)

(72) Inventors: Motoki Ito, Tokyo (JP); Ryusuke Tamanaha, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 427 days.

(21) Appl. No.: 17/972,059

(22) Filed: Oct. 24, 2022

(65) Prior Publication Data

US 2023/0171829 A1 Jun. 1, 2023

(30) Foreign Application Priority Data

Nov. 30, 2021 (JP) ................................. 2021-194419

(51) Int. Cl.
*H04W 76/15* (2018.01)
*H04W 76/23* (2018.01)
*H04W 88/04* (2009.01)

(52) U.S. Cl.
CPC ........... *H04W 76/15* (2018.02); *H04W 76/23* (2018.02); *H04W 88/04* (2013.01)

(58) Field of Classification Search
CPC ..... H04W 76/15; H04W 76/23; H04W 88/04; H04W 4/80; H04W 4/40; H04W 4/027
See application file for complete search history.

(56) References Cited

U.S. PATENT DOCUMENTS

| 2010/0194908 | A1* | 8/2010 | Karasawa | H04N 1/19594 |
| | | | | 348/222.1 |
| 2016/0332574 | A1* | 11/2016 | Park | H04N 7/181 |
| 2017/0061812 | A1 | 3/2017 | Lahav et al. | |
| 2020/0349666 | A1* | 11/2020 | Hodge | G01C 21/3602 |
| 2021/0272158 | A1* | 9/2021 | Otaka | H04W 4/021 |
| 2021/0318690 | A1* | 10/2021 | Okada | G06T 7/73 |

(Continued)

FOREIGN PATENT DOCUMENTS

| CN | 208820917 U | 5/2019 |
| JP | 2003-35551 A | 2/2003 |

(Continued)

OTHER PUBLICATIONS

Chinese Office Action Corresponding to CN Application No. 202211488502.4, dated Sep. 18, 2024, 7 pages.

(Continued)

*Primary Examiner* — Faruk Hamza
(74) *Attorney, Agent, or Firm* — Rankin, Hill & Clark LLP (57) ABSTRACT

Provided is a communication system that includes: a first imaging device; a communication unit configured to execute a first communication with a mobile communication terminal and a second communication with a communication device other than the mobile communication terminal to execute relay communication relaying the communication between the mobile communication terminal and the communication device; and a communication control unit configured to transmit, via the first communication, data of a first captured image that is captured by the first imaging device to the mobile communication terminal having the first communication established for the relay communication.

7 Claims, 4 Drawing Sheets

(56) References Cited

U.S. PATENT DOCUMENTS

2023/0245468 A1\* 8/2023 Tsuchiya ................. G06T 7/246
　　　　　　　　　　　　　　　　　　348/148
2024/0089589 A1\* 3/2024 Satoh ..................... H04N 23/64

FOREIGN PATENT DOCUMENTS

| JP | 2003-087615 | 3/2003 |
|---|---|---|
| JP | 2017-10482 A | 1/2017 |
| JP | 2021-064102 A | 4/2021 |
| JP | 2021-135965 A | 9/2021 |

OTHER PUBLICATIONS

Japanese Office Action dated Jun. 25, 2024 issued in corresponding Japanese application No. 2021-194419; English translation included (5 pages).

\* cited by examiner

COMMUNICATION SYSTEM

INCORPORATION BY REFERENCE

The present application claims priority under 35 U.S.C. § 119 to Japanese Patent Application No. 2021-194419 filed on Nov. 30, 2021. The content of the application is incorporated herein by reference in its entirety.

BACKGROUND OF THE INVENTION

Field of the Invention

The present invention relates to a communication system.

Description of the Related Art

Conventionally, there is known a technology with which a plurality of mobile communication terminals are put into a group, and images captured by cameras provided in each of the mobile communication terminals can be transmitted and received via wireless communication established among the mobile communication terminals (for example, see Japanese Patent Laid-Open No. 2003-87615).

In a case of the conventional technology described above, images that can be acquired by each of the mobile communication terminals are limited to the images of the surroundings of the mobile communication terminals captured by any of the mobile communication terminals. Therefore, with each of the mobile communication terminals, there is a disadvantage that it is difficult to acquire the captured images in a wide range of the surroundings of each of the mobile communication terminals.

The present invention has been made in view of the aforementioned circumstances, and it is an object thereof to provide a communication system capable of expanding the range of the captured images of the surroundings of the mobile communication terminals, which can be acquired by the mobile communication terminals.

SUMMARY OF THE INVENTION

As an aspect for achieving the object, there is a communication system including: a first imaging device; a communication unit configured to execute a first communication with a mobile communication terminal and a second communication with a communication device other than the mobile communication terminal to execute relay communication relaying the communication between the mobile communication terminal and the communication device; and a communication control unit configured to transmit, via the first communication, data of a first captured image that is captured by the first imaging device to the mobile communication terminal having the first communication established for the relay communication.

The communication system may be used in a mobile body and may include: a memory; and a terminal identification information saving unit configured to save, in the memory, identification information of the mobile communication terminal having the first communication established for the relay communication while the mobile body is traveling at a prescribed speed or more, in which the communication control unit transmits, via the first communication, the data of the first captured image to the mobile communication terminal that has the identification information saved in the memory.

The communication system may be used in a mobile body, in which the communication control unit may transmit, via the first communication, the data of the first captured image to the mobile communication terminal having the first communication established for the relay communication, only when the mobile body is traveling at a prescribed speed or more.

In the communication system, the communication control unit may transmit, to the mobile communication terminal having the first communication established for the relay communication, imaging time point notification information indicating a future imaging time point of the first imaging device and imaging instruction information for giving an instruction to execute imaging by a second imaging device provided in the mobile communication terminal at the imaging time point.

In the communication system, the communication control unit may transmit, to the mobile communication terminal, integrated image data generation instruction information for giving an instruction to generate integrated image data containing, in an associated manner, the data of the first captured image transmitted to the mobile communication terminal via the first communication and data of a second captured image that is captured by the second imaging device based on the imaging instruction information.

In the communication system, the communication control unit may: receive the integrated image data from the mobile communication terminal via the first communication; and transmit the integrated image data to the communication device via the second communication.

In the communication system, the communication unit may execute the relay communication for a plurality of the mobile communication terminals via the first communication established with the plurality of mobile communication terminals, and the communication control unit may transmit, via the first communication, the data of the first captured image that is captured by the first imaging device to the plurality of mobile communication terminals having the first communication established for the relay communication.

The communication system may be configured with a camera or a dashboard camera recorder.

According to the communication system described above, it is possible to expand the range of the captured images of the surroundings of the mobile communication terminals, which can be acquired by the mobile communication terminals.

DETAILED DESCRIPTION OF THE PREFERRED EMBODIMENTS

1. Use Mode of Dashboard Camera Recorder

By referring to FIG. 1, a use mode of a dashboard camera recorder 1 as an example of a configuration of a communication system of the present disclosure will be described.

The dashboard camera recorder 1 is used by being mounted to a vehicle 100, and has a function of capturing images of the surroundings of the vehicle 100 and inside the vehicle 100 by a camera. The vehicle 100 corresponds to a mobile body of the present disclosure, and a dashboard camera recorder 1 corresponds to a first imaging device of the present disclosure.

The dashboard camera recorder 1 has a function of performing cellular communication and Wi-Fi (registered trademark) communication. The dashboard camera recorder 1 performs communication with an external communication device via a wide area network 500 by performing cellular communication with a base station 300 of each cell or by performing Wi-Fi communication with a router 310 placed at a Wi-Fi spot near a road. In FIG. 1, an image management server 510 and an information providing server 520 are illustrated as the external communication devices.

Furthermore, the dashboard camera recorder 1 has a function of a Wi-Fi router that establishes Wi-Fi communication with mobile communication terminals 51, 52 that are used by users U1, U2 in the vehicle 100 and implements an in-vehicle Wi-Fi network environment. The mobile communication terminals 51 and 52 are smartphones, mobile phones, tablet terminals, mobile game machines, and the like having a Wi-Fi communication function. Cameras 51a and 52a are provided in the mobile communication terminals 51 and 52, respectively.

The dashboard camera recorder 1 functions as the Wi-Fi router to enable communication between the mobile communication terminals 51, 52 and the external communication devices such as the image management server 510 and the information providing server 520 via the in-vehicle Wi-Fi network and the wide area network 500. The users U1 and U2 can acquire information by having communication with the information providing server 520, for example, by using the in-vehicle Wi-Fi network environment provided by the dashboard camera recorder 1, even when the mobile communication terminals 51 and 52 do not have the cellular communication function.

Moreover, by using the in-vehicle Wi-Fi network environment of the dashboard camera recorder 1, it is also possible to communicate with external mobile communication terminals 53, 54, and 55 near the vehicle 100. FIG. 1 illustrates a state where wireless communication via the in-vehicle Wi-Fi is established between the dashboard camera recorder 1 and the mobile communication terminal 53 used by a user U3 standing on a sidewalk and the mobile communication terminals 54, 55 used by users U4, U5 riding in an oncoming vehicle 110. Cameras 53a to 55a are provided in the mobile communication terminals 53 to 55, respectively.

Furthermore, the dashboard camera recorder 1 transmits the captured image that is captured by the camera to the image management server 510 via the wide area network 500. The image management server 510 uses the captured image received from the dashboard camera recorder 1 to perform processing such as analysis of an accident, fixed point observation, inspection of road equipment, and the like.

Note here that wireless communication between the dashboard camera recorder 1 and the mobile communication terminals 51 to 55 corresponds to a first communication of the present disclosure, and wireless communication between the dashboard camera recorder 1 and the external communication devices such as the image management server 510 and the information providing server 520 corresponds to a second communication of the present disclosure. Relay communication relaying the communication between the mobile communication terminals 51 to 55 and the external communication devices is executed by the first communication and the second communication.

2. Configuration of Dashboard Camera Recorder

By referring to FIG. 2, the configuration of the dashboard camera recorder 1 will be described. The dashboard camera recorder 1 includes a processor 10, a memory 20, a NAD (Network Access Device) 30, an antenna 31, a front camera 32, a rear camera 33, an in-vehicle camera 34, a GNSS (Global Navigation Satellite System) sensor 35, an acceleration sensor 36, a switch 37, and a display 38. The front camera 32, the rear camera 33, and the in-vehicle camera 34 correspond to a first imaging device of the present disclosure.

The NAD 30 is a chip in which a cellular communication module and a Wi-Fi communication module are integrated. The antenna 31 is a dual-use antenna corresponding to both cellular communication and Wi-Fi communication. The NAD 30 and the antenna 31 form a communication unit of the present disclosure.

The front camera 32 captures an image of the surroundings of a front view of the vehicle 100 and outputs the captured image to the processor 10. The rear camera 33 captures an image of the surroundings of a rear view of the vehicle 100 and outputs the captured image to the processor 10. The in-vehicle camera 34 captures an image of the inside of the vehicle 100 and outputs the captured image to the processor. Note that it is also possible to employ a configuration that includes not all of the front camera 32, the rear camera 33, and the in-vehicle camera 34 but only the front camera 32, for example.

The GNSS sensor 35 receives a radio wave from a positioning satellite to detect the current position (latitude, longitude) of the dashboard camera recorder 1, and outputs a position detection signal to the processor 10. The acceleration sensor 36 detects the acceleration generated in the dashboard camera recorder 1, and outputs an acceleration detection signal to the processor 10. The acceleration sensor 36 detects the acceleration in three orthogonal axis directions, for example. The switch 37 outputs operation signals corresponding to operations of the users U1 and U2 to the processor 10. The display 38 displays an operation state and the like of the dashboard camera recorder 1 in accordance with control input from the processor 10.

The processor 10 functions as an imaging control unit 11, a communication control unit 12, a terminal identification information saving unit 13, a timer unit 15, and a speed recognition unit 16 by reading and executing a control program 21 for the dashboard camera recorder 1 saved in the memory 20.

The imaging control unit 11 captures an image by at least one of the front camera 32, the rear camera 33, and the in-vehicle camera 34 at a prescribed imaging timing, and saves the captured image in the memory 20. As the imaging timing, timings of (1) to (4) as follows are set, for example.

(1) When Vehicle 100 Encounters Accident

The imaging control unit 11 recognizes that the vehicle 100 has encountered an accident by detecting the acceleration in a level of a prescribed threshold or more by the acceleration sensor 36. It is also possible to recognize an accident of the vehicle 100 based on an impact detection signal acquired by an impact sensor provided for an airbag or the like mounted to the vehicle 100.

(2) When Vehicle 100 Travels through Fixed Point

The imaging control unit 11 recognizes that the vehicle 100 is traveling through a fixed point set in advance from the current position of the dashboard camera recorder 1 detected by the GNSS sensor 35. As the fixed point, for example, a point where a traffic jam is likely to occur, a point where road equipment (road sign, utility pole, or the like) as the target of maintenance is located, a sightseeing spot, or the like may be set.

(3) When Vehicle 100 Travels through Image Capturing Request Point

The imaging control unit 11 recognizes the image capturing request point by receiving information of the image capturing request point transmitted from the image management server 510, and recognizes that the vehicle 100 is traveling through the image capturing request point from the current position of the dashboard camera recorder 1 detected by the GNSS sensor 35. As the image capturing request point, for example, an accident site of another vehicle, a fire site, a site where a child is lost, or the like is set.

Figure 1:
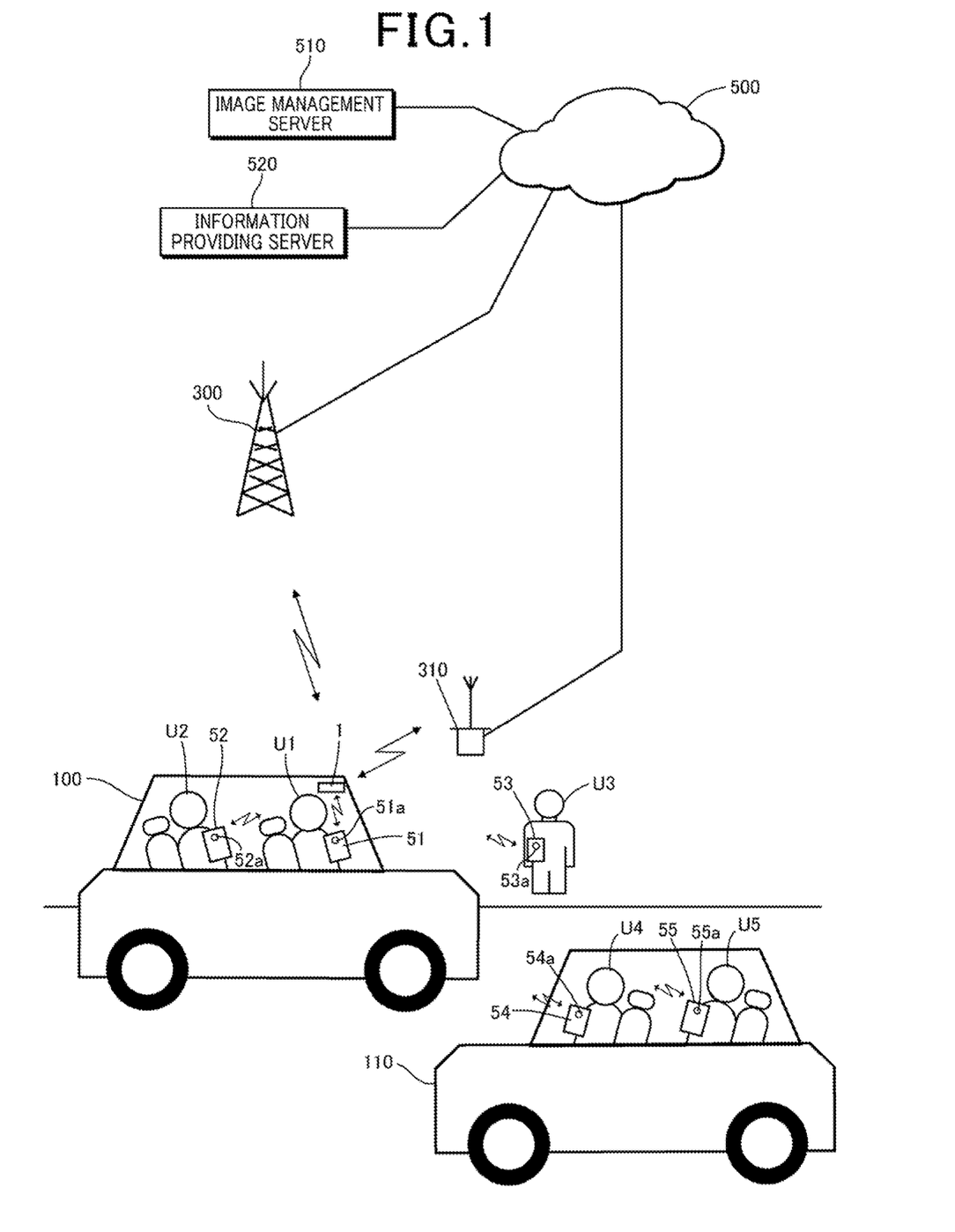
FIG. 1 is an explanatory diagram of a use mode of a dashboard camera recorder.

(4) When Image Capturing Request Information is Received from Mobile Communication Terminal For example, as illustrated in FIG. 1, for capturing images of the scenery of the surroundings the vehicle 100 being traveling and capturing images inside the vehicle 100, the users U1, U2 riding in the vehicle 100 operate the mobile communication terminals 51, 52 to transmit image capturing request information to the dashboard camera recorder 1 via the in-vehicle Wi-Fi communication. In the dashboard camera recorder 1 that has received the image capturing request information, the imaging control unit 11 captures an image by the front camera 32, the rear camera 33, or the in-vehicle camera 34, and the communication control unit 12 transmits the data of the captured image (corresponds to a first captured image of the present disclosure) to the mobile communication terminals 51, 52. Furthermore, the users U4, U5 riding in the oncoming vehicle 110 can have the imaging control unit 11 execute imaging and the like of the traveling oncoming vehicle 110 by operating the mobile communication terminals 54, 55 to transmit the image capturing request information to the dashboard camera recorder 1 via the in-vehicle Wi-Fi communication.

The communication control unit 12 executes captured image transmission processing for transmitting the captured images that are captured and saved in the memory 20 by the imaging control unit 11 to the image management server 510 via the wide area network 500 by the NAD 30. Furthermore, the communication control unit 12 executes in-vehicle Wi-Fi communication processing for performing communication between the mobile communication terminals 51, 52 and the external communication device such as the information providing server 520 by relaying the in-vehicle Wi-Fi network and the wide area network 500.

The communication control unit 12 packetizes data that is a combination of information data of the in-vehicle Wi-Fi and data of the captured image, and performs communication with the external communication device via the wide area network 500 by packet communication. With this processing, the overhead of control data added to the information data of the captured image and the like transmitted by packet is shrunk and the communication volume is reduced, so that it is possible to reduce the communication cost borne by the users U1 and U2.

While the vehicle 100 is traveling, the terminal identification information saving unit 13 acquires the terminal identification information of the mobile communication terminal having the in-vehicle Wi-Fi communication established with the NAD 30, and saves it in a terminal identification information slot 22 of the memory 20. The terminal identification information is unique identification information allotted to each of the mobile communication terminals. The communication control unit 12 recognizes that the mobile communication terminal having the established in-vehicle Wi-Fi communication is the registered mobile communication terminal by collating it with the terminal identification information saved in the terminal identification information slot 22.

The timer unit 15 performs processing for counting the current date and time. The imaging control unit 11 adds information of the date and time that is the imaging timing counted by the timer unit 15 to the captured images that are captured by the front camera 32, the rear camera 33, and the in-vehicle camera 34, and saves the captured images in the memory 20. The speed recognition unit 16 recognizes the traveling speed (moving speed) of the vehicle 100 by receiving a speed detection signal Vcar from a car speed sensor provided in the vehicle 100. The dashboard camera recorder 1 receives the speed detection signal Vcar by performing wired or wireless communication with an ECU (Electronic Control Unit) that is provided in the vehicle 100. The speed recognition unit 16 may recognize the traveling speed (moving speed) of the vehicle 100 by performing prescribed image processing on the captured image.

3. Captured Image Providing Processing

According to the flowcharts illustrated in FIG. 3 and FIG. 4, captured image providing processing executed by the dashboard camera recorder 1 will be described. Herein, described is the processing of a case where the data of the captured image that is captured by any of the front camera 32, the rear camera 33, and the in-vehicle camera 34 of the dashboard camera recorder 1 is transmitted to the mobile communication terminals 51, 52 used by the users U1, U2 riding in the traveling vehicle 100, as illustrated in FIG. 1. The dashboard camera recorder 1 repeatedly executes the processing through the flowchart of FIG. 3.

Figure 3:
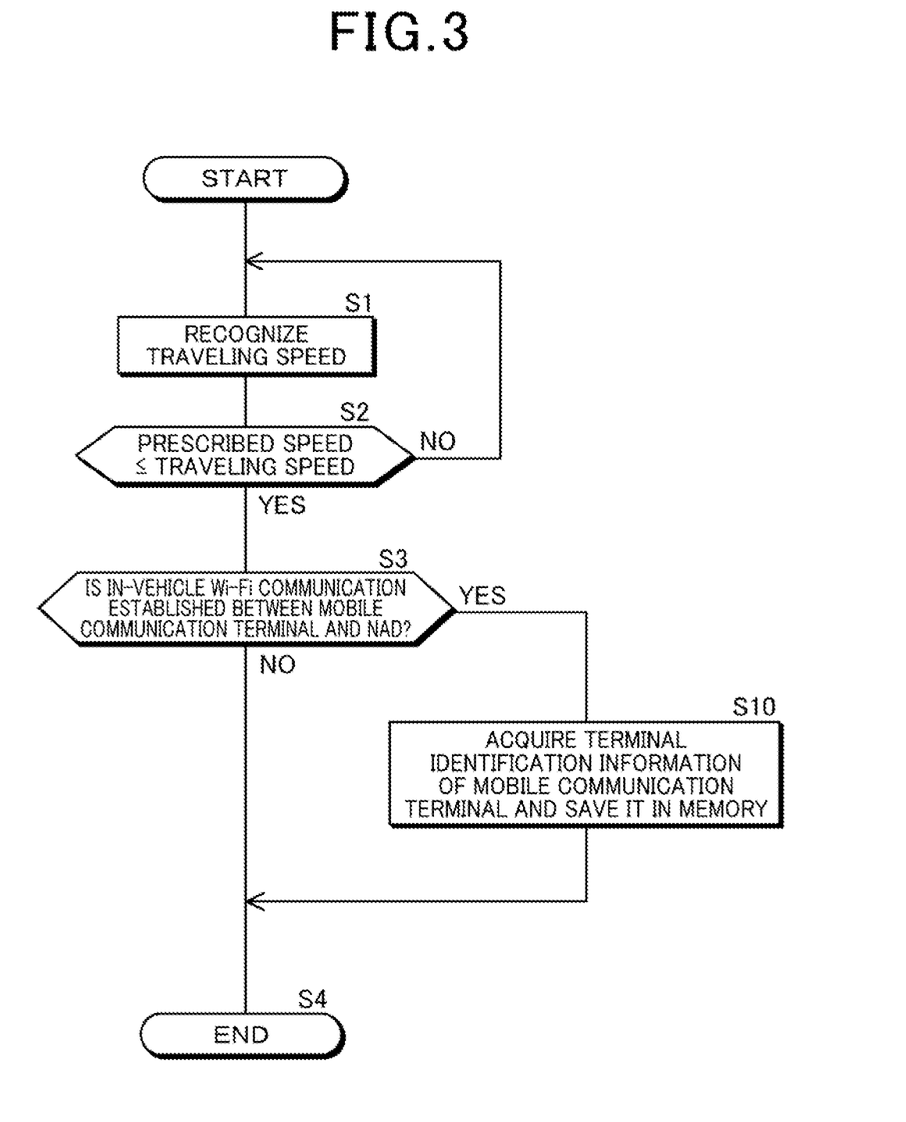
FIG. 3 is a flowchart of processing for saving terminal identification information of a mobile communication terminal.

FIG. 3 is a flowchart of the processing for acquiring the terminal identification information of the mobile communication terminal carried into the vehicle 100 and saving it in the terminal identification information slot 22 of the memory 20. In Step S1 of FIG. 3, the speed recognition unit 16 recognizes the traveling speed of the vehicle 100. In following Steps S2 to S3 and Step 10 are the processing executed by the terminal identification information saving unit 13.

In Step S2, the terminal identification information saving unit 13 determines whether or not the traveling speed of the vehicle 100 is equal to or more than a prescribed speed (for example, set at about 10 km/h). Then, the terminal identification information saving unit 13 proceeds the processing to Step S3 when the traveling speed is equal to or more than the prescribed speed, and proceeds the processing to Step S2 when the traveling speed is less than the prescribed speed.

In Step S3, the terminal identification information saving unit 13 determines whether or not the in-vehicle Wi-Fi communication is established between the mobile communication terminal and the NAD 30. Then, the terminal identification information saving unit 13 proceeds the processing to Step S10 when the in-vehicle Wi-Fi communication is established, and proceeds the processing to Step S4 when the in-vehicle Wi-Fi communication is not established. In Step S10, the terminal identification information saving unit 13 acquires the terminal identification information transmitted from the mobile communication terminal and saves it in the terminal identification information slot 22 of the memory 20, and proceeds the processing to Step S4.

In the case of FIG. 1, when the in-vehicle Wi-Fi communication is established between the mobile communication terminal 51 and the NAD 30 of the dashboard camera recorder 1 in the traveling vehicle 100, the terminal identification information saving unit 13 saves the terminal identification information of the mobile communication terminal 51 in the terminal identification information slot 22 of the memory 20. Similarly, when the in-vehicle Wi-Fi communication is established between the mobile communication terminal 52 and the dashboard camera recorder 1, the terminal identification information saving unit 13 saves the terminal identification information of the mobile communication terminal 52 in the terminal identification information slot 22 of the memory 20.

Figure 4:
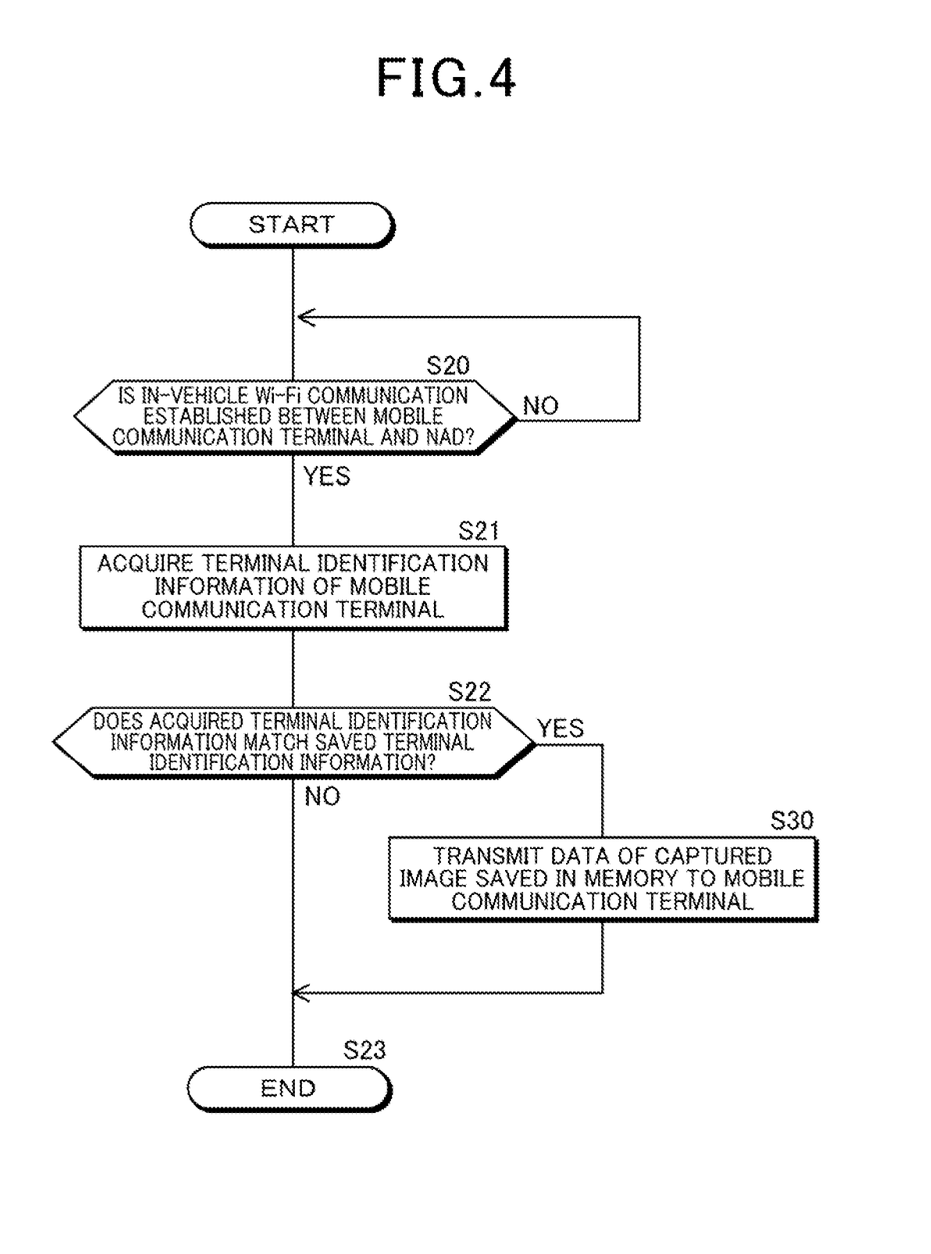
FIG. 4 is a flowchart of processing for transmitting a captured image to a mobile communication terminal.

Next, FIG. 4 is a flowchart of the processing for providing the data of the image captured by the dashboard camera recorder 1 to the communication terminal that has the terminal identification information thereof saved in the terminal identification information slot 22 of the memory 20. In Step S20 of FIG. 4, the communication control unit 12 determines whether or not the in-vehicle Wi-Fi communication is established between the mobile communication terminal and the NAD.

Then, the communication control unit 12 proceeds the processing to Step S21 when the in-vehicle Wi-Fi communication is established, and makes determination in Step S20 again when the in-vehicle Wi-Fi communication is not established. In Step S21, the communication control unit 12 acquires the terminal identification information transmitted from the mobile communication terminal having the established in-vehicle Wi-Fi communication.

In a following Step S22, the communication control unit 12 determines whether or not the terminal identification information acquired in Step S21 matches the terminal identification information saved in the terminal identification information slot 22. Then, the communication control unit 12 proceeds the processing to Step S30 when the terminal identification information matches, and proceeds the processing to Step S23 when the terminal identification information does not match.

In Step S30, the communication control unit 12 transmits the data of the captured image saved in the memory 20 by the imaging control unit 11 to the mobile communication terminal, and proceeds the processing to Step S23. In the case of FIG. 1, when the in-vehicle Wi-Fi communication is established between the mobile communication terminals 51, 52 inside the vehicle 100 and the NAD 30, the data of the captured image is transmitted to the mobile communication terminals 51, 52 from the dashboard camera recorder 1.

Furthermore, when the user U1 gets out from the vehicle 100 and the in-vehicle Wi-Fi communication between the mobile communication terminal 51 and the NAD 30 is cut off, at the timing where the user U1 returns to the vehicle 100 thereafter and the in-vehicle Wi-Fi communication between the mobile communication terminal 51 and the NAD 30 is established, the data of the captured image is transmitted to the mobile communication terminal 51 from the dashboard camera recorder 1. This allows the user U1 to acquire the image and the like of the user oneself approaching the vehicle 100 captured by the dashboard camera recorder 1.

4. Other Embodiments

While the four-wheeled vehicle 100 is described in the embodiment above as the mobile body to which the dashboard camera recorder 1 is mounted, the mobile body to which the dashboard camera recorder 1 is mounted may also be a two-wheeled vehicle, a flying object, a boat, or the like.

While the cellular or Wi-Fi communication is used for accessing the wide area network 500 in the embodiment described above, it is also possible to use other communication schemes. Furthermore, while the in-vehicle Wi-Fi (corresponds to a second communication network of the present discloser) is used to establish communication between the mobile communication terminals 51, 52 used by the users U1, U2 of the vehicle 100 and the dashboard camera recorder 1, it is also possible to use other communication specifications such as Bluetooth (registered trademark).

While the case of configuring the communication system of the present disclosure with the dashboard camera recorder 1 is described in the embodiment above, the communication system of the present disclosure may also be configured with a communication terminal having a camera (a smartphone, a mobile phone, a tablet terminal, a camera with communication function, or the like), or the like.

In the embodiment described above, by the processing performed through the flowcharts illustrated in FIG. 3 and FIG. 4, the terminal identification information of the mobile communication terminals 51, 52 used by the users U1, U2 riding in the vehicle 100 is saved, and the data of the captured images acquired by the dashboard camera recorder 1 is transmitted to the mobile communication terminals 51, 52. As another embodiment, it is also possible to transmit the captured images acquired by the dashboard camera recorder 1 to the mobile communication terminals used by the users other than the users U1, U2 of the vehicle 100, such as the user U3 on the sidewalk, the users U4, U5 riding in the other vehicle 110, or the like illustrated in FIG. 1. In that case, the mobile communication terminal recognizing the in-vehicle Wi-Fi communication of the dashboard camera recorder 1 may make a connection request to the dashboard camera recorder 1 to establish the in-vehicle Wi-Fi communication and make a request to the dashboard camera recorder 1 to capture an image and to transmit the data of the captured image, or to transmit the data of the already captured image.

Also, when the vehicle 100 is traveling at the prescribed speed or more, the communication control unit 12 may transmit the data of the captured image to the mobile communication terminal having the in-vehicle Wi-Fi communication established with the NAD 30. Alternatively, only when the vehicle 100 is traveling at the prescribed speed or more, the communication control unit 12 may transmit the data of the captured image to the mobile communication terminal having the in-vehicle Wi-Fi communication established with the NAD 30. This makes it possible to transmit the captured images acquired by the dashboard camera recorder 1 only to the mobile communication terminals 51, 52 used by the users U1, U2 riding in the vehicle 100 as illustrated in FIG. 1.

In the embodiment described above, the communication control unit 12 may transmit, to the mobile communication terminal having the first communication established for the relay communication, imaging time point notification information indicating future imaging time points of the cameras 32 to 34 and imaging instruction information for giving an instruction to the camera (corresponds to a second imaging device of the present disclosure) provided in the mobile communication terminal to execute imaging at the imaging time point. Furthermore, the communication control unit 12 may generate a message such that the imaging time point notification information is the imaging instruction information. Thereby, by transmitting the imaging instruction information and the imaging time point notification information for notifying the imaging time point under a state where the vehicle 100 is traveling through a scenic area, for example, to the mobile communication terminals 51, 52 in the vehicle 100, it is possible to have the built-in cameras 51a, 52a (correspond to the second imaging device of the present disclosure) of the mobile communication terminals 51, 52 capture images by synchronizing with the timing traveling through the scenic area. Then, when traveling through the scenic area, it is possible to acquire captured images in a wide range by the front camera 32, the rear camera 33, and the in-vehicle camera 34, in addition to the captured images by the cameras of the mobile communication terminals 51 and 52.

In the embodiment described above, the communication control unit 12 may transmit, to the mobile communication terminal, integrated image data generation instruction information for giving an instruction to generate integrated image data containing, in an associated manner, the data of the first captured image transmitted to the mobile communication terminal via the first communication and the data of the second captured image that is captured by the camera (second imaging device) provided in the mobile communication terminal based on the imaging instruction information. Furthermore, the communication control unit 12 may generate a message such that the imaging time point notification information and the imaging instruction information are the integrated image data generation instruction information.

Furthermore, the communication control unit 12 may receive the integrated image data from the mobile communication terminal via the first communication, and may transmit the integrated image data to the communication device other than the mobile communication terminal, such as the image management server 510, via the second communication.

In the embodiment above, described is the configuration in which the dashboard camera recorder 1 communicates with the mobile communication terminals 51 to 55 via wireless communication. However, as illustrated in FIG. 1, when the mobile communication terminals 51 and 52 are used inside the vehicle 100, the mobile communication terminals 51 and 52 may also be connected to the dashboard camera recorder 1 via a communication cable to perform wired communication.

In the embodiment described above, for the mobile communication terminals 51, 52 used by the users U1, U2 riding in the traveling vehicle 100 as illustrated in FIG. 1, the terminal identification information saving unit saves the terminal identification information in the terminal identification information slot 22. As another embodiment, by executing an image capturing request app (application) to be executed by the mobile communication terminal, the terminal identification information of the mobile communication terminal may be transmitted to the dashboard camera recorder 1 from the mobile communication terminal via the image management server 510 and the like to be saved in the terminal identification information slot 22. In that case, the user other than the users U1 and U2 of the vehicle 100, when approaching the vehicle 100 and the in-vehicle Wi-Fi communication is thereby established between the carrying mobile communication terminal and the dashboard camera recorder 1, can receive and acquire, by the mobile communication terminal, the data of the captured images acquired by the dashboard camera recorder 1 by the processing performed by the communication control unit 12.

Furthermore, as for the mobile communication terminal whose terminal identification information is not saved in the terminal identification information slot 22, the communication control unit 12 may transmit the captured images acquired by the cameras 32 to 34 when the in-vehicle Wi-Fi communication is established with the NAD 30.

Figure 2:
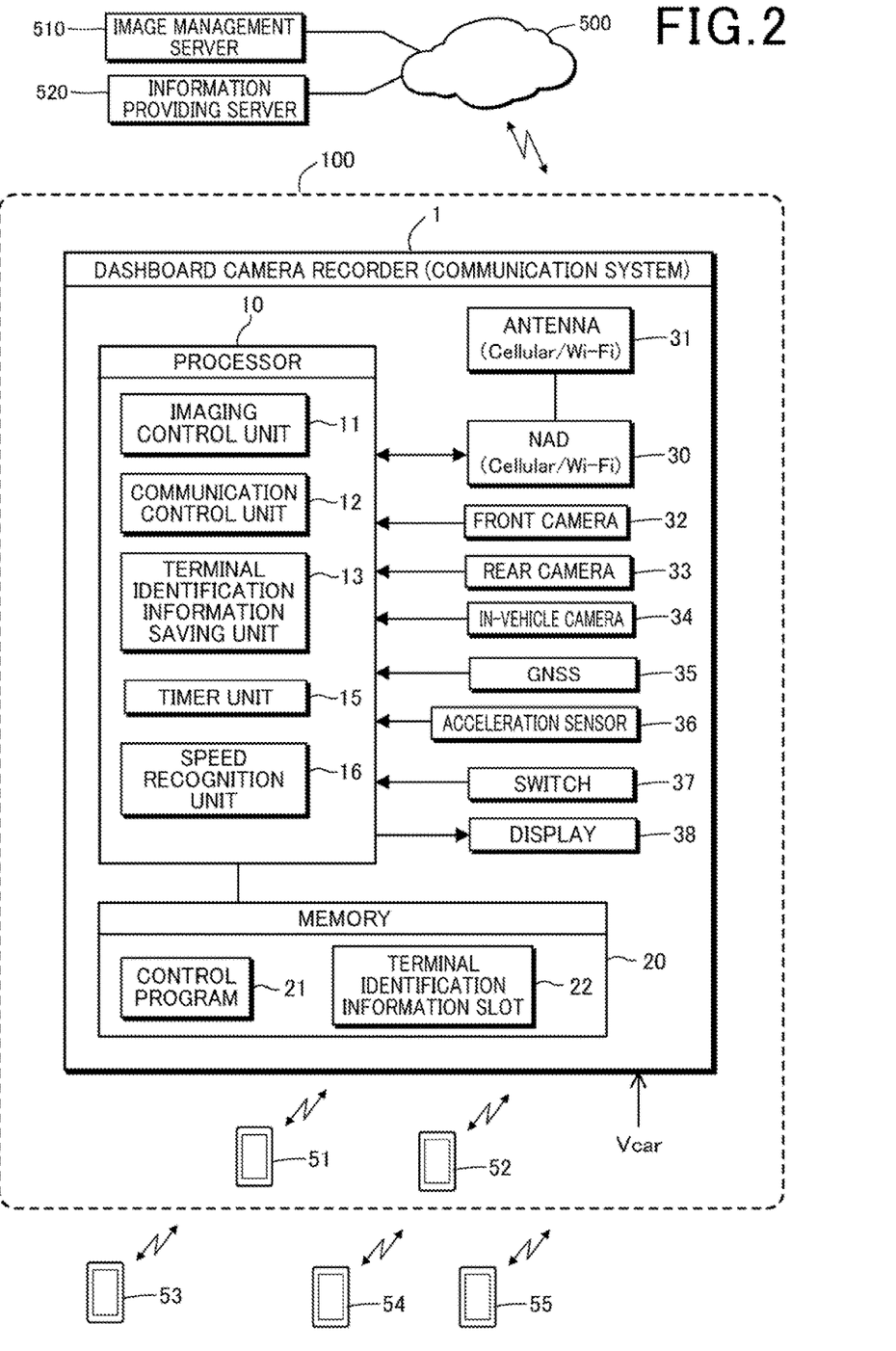
FIG. 2 is a block diagram of the dashboard camera recorder.

Note that FIG. 2 is a schematic diagram illustrating the configuration of the dashboard camera recorder 1 by sectioning it in accordance with the main processing contents in order to facilitate understanding of the present invention, and the configuration of the dashboard camera recorder 1 may also be formed by other sectioned blocks. Furthermore, the processing of each structural element may be executed by a single hardware unit or may be executed by a plurality of hardware units. Moreover, the processing of each structural element according to the flowcharts illustrated in FIG. 3 and FIG. 4 may be executed by a single program or may be executed by a plurality of programs.

4. Configurations Supported by the Embodiments

The above-described embodiments support the following items.

(Item 1) A communication system including: a first imaging device; a communication unit configured to execute a first communication with a mobile communication terminal and a second communication with a communication device other than the mobile communication terminal to execute relay communication relaying the communication between the mobile communication terminal and the communication device; and a communication control unit configured to transmit, via the first communication, data of a first captured image that is captured by the first imaging device to the mobile communication terminal having the first communication established for the relay communication.

According to the communication system of item 1, by transmitting the data of the first captured image that is captured by the first imaging device of the communication system to the mobile communication terminal that uses the relay communication provided by the communication system, it is possible to expand the range of the captured image of the surroundings of the mobile communication terminal, which can be acquired by the mobile communication terminal.

(Item 2) The communication system according to item 1, the communication system being used in a mobile body and including: a memory; and a terminal identification information saving unit configured to save, in the memory, identification information of the mobile communication terminal having the first communication established for the relay communication while the mobile body is traveling at a prescribed speed or more, in which the communication control unit transmits, via the first communication, the data of the first captured image to the mobile communication terminal that has the identification information saved in the memory.

In the communication system of item 2, the mobile communication terminal that is using the relay communication provided by the communication system while the mobile body is traveling at the prescribed speed or more can be determined to be a mobile communication terminal used by a user riding in the mobile body. Thus, in that case, by saving the identification information of the mobile communication terminal, the data of the first captured image that is captured by the first imaging device of the communication system while the user is away from the mobile body and the first communication is cut off can be transmitted to the mobile communication terminal, when the user returns to the mobile body and the first communication is reestablished.

(Item 3) The communication system according to item 1, the communication system being used in a mobile body, in which the communication control unit transmits, via the first communication, the data of the first captured image to the mobile communication terminal having the first communication established for the relay communication, only when the mobile body is traveling at a prescribed speed or more.

According to the communication system of item 3, it is possible to transmit the data of the first captured image that is captured by the first imaging device of the communication system only to the mobile communication terminal used by the user riding in the mobile body.

(Item 4) The communication system according to any one of items 1 to 3, in which the communication control unit transmits, to the mobile communication terminal having the first communication established for the relay communication, imaging time point notification information indicating a future imaging time point of the first imaging device and imaging instruction information for giving an instruction to execute imaging by a second imaging device provided in the mobile communication terminal at the imaging time point.

According to the communication system of item 4, by notifying the future imaging time point of the first imaging device of the communication system to the mobile communication terminal, it is possible on the mobile communication side to execute imaging by the second imaging device provided in the mobile communication terminal by synchronizing with the imaging timing of the camera of the communication system.

(Item 5) The communication system according to item 4, in which the communication control unit transmits, to the mobile communication terminal, integrated image data generation instruction information for giving an instruction to generate integrated image data containing, in an associated manner, the data of the first captured image transmitted to the mobile communication terminal via the first communication and data of a second captured image that is captured by the second imaging device based on the imaging instruction information.

According to the communication system of item 5, it is possible to encourage generation and utilization of the integrated image data in the mobile communication terminal.

(Item 6) The communication system according to item 5, in which the communication control unit: receives the integrated image data from the mobile communication terminal via the first communication; and transmits the integrated image data to the communication device via the second communication.

According to the communication system of item 6, it is possible for the communication device to perform the processing utilizing the integrated image data.

(Item 7) The communication system according to any one of items 1 to 6, in which the communication unit executes the relay communication for a plurality of the mobile communication terminals via the first communication established with the plurality of mobile communication terminals, and the communication control unit transmits, via the first communication, the data of the first captured image that is captured by the first imaging device to the plurality of mobile communication terminals having the first communication established for the relay communication.

According to the communication system of item 7, it is possible to provide the data of the first captured image to the plurality of communication terminals.

(Item 8) The communication system according to any one of items 1 to 7, the communication system being configured with a camera or a dashboard camera recorder.

According to the communication system of item 8, it is possible to achieve the above-described communication system according to items 1 to 7 as functions of the camera or the dashboard camera recorder.

REFERENCE SIGNS LIST

1 Dashboard camera recorder
10 Processor
11 Imaging control unit
12 Communication control unit
13 Terminal identification information saving unit
15 Timer unit
16 Speed recognition unit
20 Memory
21 Control program
22 Terminal identification information slot
30 NAD
31 Antenna
32 Front camera
33 Rear camera
34 In-vehicle camera
35 GNSS
36 Acceleration sensor
37 Switch
38 Display
51 to 55 Mobile communication terminal
51a to 55a Camera
100 Vehicle (mobile body)
110 Another vehicle
300 Cellular communication base station
310 Wi-Fi spot router
500 Wide area network
510 Image management server
520 Information providing server
U1 to U5 User

What is claimed is:

1. A communication system comprising:
a first imaging device;
a communication unit including an NAD (Network Access Device) and an antenna; and
a processor,
wherein the processor is configured to:
control the communication unit to have a router function of performing a first communication in a first network environment and an external communication function of performing a second communication in a second network environment wider than the first network environment, the processor controlling the communication unit to execute the first communication with a mobile communication terminal and the second communication with a communication device other than the mobile communication terminal to execute relay communication relaying the communication between the mobile communication terminal and the communication device;
control the communication unit to transmit, via the first communication, data of a first captured image that is captured by the first imaging device to the mobile communication terminal having the first communication established for the relay communication; and control the communication unit to transmit, to the mobile communication terminal having the first communication established for the relay communication, imaging time point notification information indicating a future imaging time point of the first imaging device and imaging instruction information for giving an instruction to execute imaging by a second imaging device provided in the mobile communication terminal at the future imaging time point.

2. The communication system according to claim 1, wherein the processor is configured to control the communication unit to transmit, to the mobile communication terminal, integrated image data generation instruction information for giving an instruction to generate integrated image data containing, in an associated manner, the data of the first captured image transmitted to the mobile communication terminal via the first communication and data of a second captured image that is captured by the second imaging device based on the imaging instruction information.

3. The communication system according to claim 2, wherein the processor is configured to control the communication unit to receive the integrated image data from the mobile communication terminal via the first communication; and transmit the integrated image data to the communication device via the second communication.

4. The communication system according to claim 1, wherein
the communication system is used in a mobile body and further comprises a memory,
the processor is further configured to save, in the memory, identification information of the mobile communication terminal having the first communication established for the relay communication while the mobile body is traveling at a prescribed speed or more, and
the processor is configured to control the communication unit to transmit, via the first communication, the data of the first captured image to the mobile communication terminal that has the identification information saved in the memory.

5. The communication system according to claim 1, wherein
the communication system is used in a mobile body, and
the processor is configured to control the communication unit to transmit, via the first communication, the data of the first captured image to the mobile communication terminal having the first communication established for the relay communication, only when the mobile body is traveling at a prescribed speed or more.

6. The communication system according to claim 1, wherein
the processor is configured to control the communication unit to execute the relay communication for a plurality of the mobile communication terminals via the first communication established with the plurality of mobile communication terminals, and
the processor is configured to control the communication unit to transmit, via the first communication, the data of the first captured image that is captured by the first imaging device to the plurality of mobile communication terminals having the first communication established for the relay communication.

7. The communication system according to claim 1, wherein the first imaging device is a camera or a dashboard camera recorder.

* * * * *